April 3, 1962  J. LOW  3,027,677
FISHHOOK WITH RETRACTIBLE BILL PORTION
Filed Feb. 11, 1960

James Low
INVENTOR.

BY Clarence A. O'Brien
and Harvey B. Jacobson
Attorneys

United States Patent Office 3,027,677
Patented Apr. 3, 1962

3,027,677
FISHHOOK WITH RETRACTIBLE BILL PORTION
James Low, 1035 Holland Ave., Saginaw, Mich.
Filed Feb. 11, 1960, Ser. No. 8,120
3 Claims. (Cl. 43—44.82)

The present invention relates to a fish hook which is so designed and constructed that it may be more easily handled when not being used and may be satisfactorily put away or stored temporarily in a tackle box or an equivalent container without becoming entangled with other hooks and tackle.

Constant effort to perfect and achieve the best all-around fish hook has resulted in the bringing into being of countless hooks. Nevertheless, situations and conditions differing continue to demand the use of hooks of different types. Since there can apparently be no one or particular pattern that would result in standardizing fish hooks it can be appreciated that deviations for specific purposes will continue to flourish. For the most part, fish hooks are either in the single or treble category.

Speaking in terms of generalities the commonly used fish hook is characterized by a shank with a line attaching eye rigid at one end thereof and a curvate bend at the other end terminating in a pointed or an equivalent barb. When fish hooks of this type are strewn in a tackle box they not only become entangled with each other but with other equipment and tackle; so, there has long existed the problem of doing something practical about the entanglement difficulties. It follows that the instant invention pertains to a fish hook, either single or multiple, wherein the curvate barb-equipped bend or bill portion is openable and closable, that is, assumes a normal ready-to-fish open position but may be folded so that the point is out of the way and guarded by the adjacent shank to virtually eliminate tangling.

In carrying out the principles of the invention, the bent portion of the hook is hingedly mounted on the cooperating end of the shank and this construction allows the barbed terminal or bill portion to be folded in and against the shank to, in this manner, assume an out-of-the-way position, suitably tensioned spring means being provided to stabilize the hinge and to normally hold the hook in an open position or, alternatively, to allow the folded guarded position to be assumed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
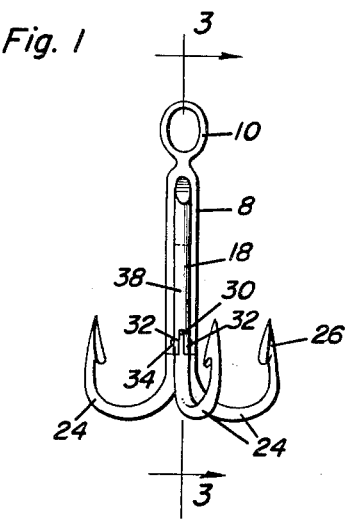
FIG. 1 is a view in elevation of a treble fish hook constructed in accordance with the principles of the present invention showing the barbed hooks in their normal equidistant circumferentially spaced fishing relationship.
Figure 2:
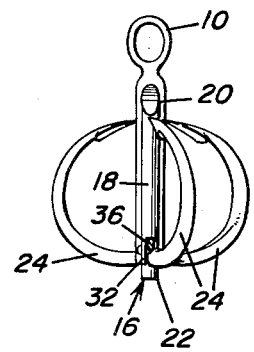
FIG. 2 is a view based on FIG. 1 and also in elevation and showing how the barbed bills appear when retracted or moved to the closed out-of-the-way position.

Various kinds of anti-pricking shields, attachable and detachable guards, special boxes and containers and card-type racks have been proposed for use in rendering the dangerous pointed barbs of fish hooks less troublesome and with a view toward safeguarding anyone called upon to handle ever-dangerous fish hooks. The present invention is believed to be a new approach and a solution of the problem by incorporating the safeguarding feature in the hook itself. More specifically, the shank is expressly constructed to include a hinge or an equivalent joint which makes it possible to fold the pointed barb so that it is in close proximity to the shank and so that the shank constitutes a safeguarding means.

With reference to the drawing, it may be mentioned at the outset that the principle in concept herein revealed is applicable not only to multiple-type fish hooks but to single-type hooks as well. Broadly, the utilization of a spring-loaded shank with the eye at one end and the barbed bill at the other end comprehends the nature of the achievement under advisement and makes possible the provision of a hinged or pivoted hook which is normally out of play, as it were, but which allows the hook to swing or move from its extended open position to its retracted closed position.

Figure 3:
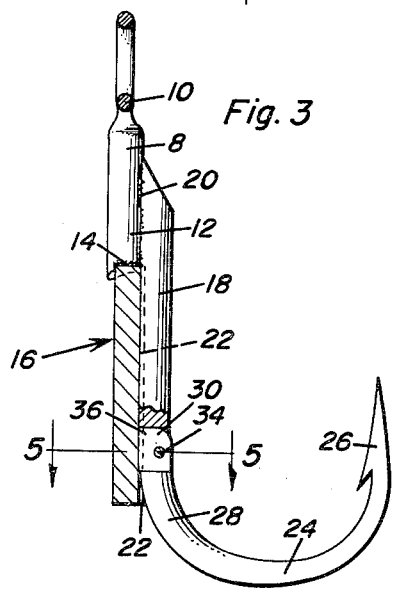
FIG. 3 is an enlarged view on the plane of the vertical line 3—3 of FIG. 2 looking in the direction of the arrows.
Figure 4:
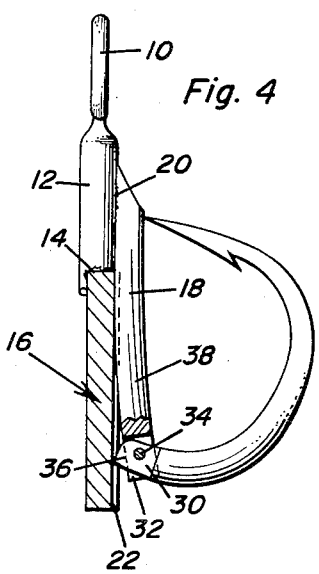
FIG. 4 is a view similar to FIG. 3 but showing the position of the hinged hook when it is folded to a guarded out-of-the-way position.
Figure 6:
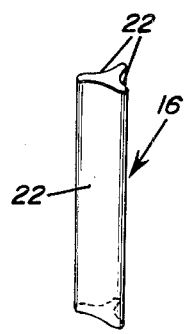
FIG. 6 is a view in perspective of one of the components which may be treated as a yieldable member or spring means.
Figure 5:
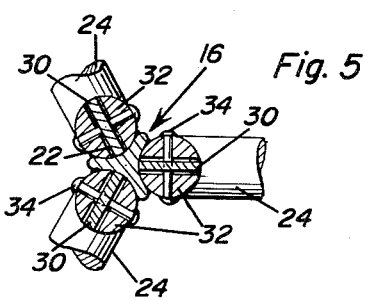
FIG. 5 is a section on the plane of the line 5—5 of FIG. 3 looking in the direction of the arrows.

In the treble-type hook shown the numeral 8 designates a component part of a shaft, there being an integral line attaching eye 10 at one end. Welded or otherwise secured to the end portion 12 of the shaft, as at 14, is a springy steel axial extension 16 providing the desired spring-biased or spring-loading means. The several fish hooks are arranged circumferentially around the shaft made up of the components 8 and 16. The term "shaft" is being used to identify components 8 and 18 as an entity and also to differentiate from the term "shank" which will now be used to designate the stem or shank 18 of one fish hook. This shank is disposed alongside the components 8 and 16 and is fixed at 20 by welding or otherwise to the shaft 8. A major portion thereof resides in a complemental groove or channel 22 in a confronting surface of the shaft extension 16. The term "hook" is being used here to identify the arcuate or curvate rigid bent portion or bend 24 the free end or terminal of which is provided with a barbed bill or point 26. This point may be of any desired shape but is preferably that which is herein illustrated. The inner end portion 28 of this bend has a reduced lug 30 fitting between furcations 32 provided at the bifurcated end of the shank 18. The furcations and lug (which in effect provide assembling and hinging ears) are pierced by an assembling and hinging pin 34 which provides the desired hinged joint. One corner portion of the lug, as at 36, functions as a cam or releasable detent when in the position seen, for instance, in FIG. 4, that is, the closed position of the fish hook. When in the normal or open fishing position seen in FIG. 3 the hinged joint is of no moment except that one edge of the lug rests against the springy metal shaft extension 16 to assist in keeping the component portions 18 and 28 and the hinged joint in a normal inactive fish hook shape. Not only is the extension 16 of yielding or springy steel, the end portion 38 of the shank is also slightly yieldable so that the parts conjointly provide the desired spring means, that is, means which is normally not noticeable when the hooks are in open fishing position but which comes into play when one manually catches hold of the bent portion 24 and swings it on the hinge pin and causes it to assume the out-of-the-way closed and protected position illustrated in FIG. 4. By reason of the type of hinge joint employed and the spring means the construction resembles a rule joint or what is sometimes frequently referred to as a penknife blade joint. Just as a penknife is folded into a sheath and protected when not in use, the barbed bill 26 here is folded to the safeguarded out-of-use position seen in FIG. 4. Consequently, when the hook is not in use it is capable of being handled readily and with safety. Moreover, when the fish hook is thrown, as it were, in a fishing tackle box, there is less likelihood of the hook tangling with other hooks and other tackle and other paraphernalia.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing device comprising a shaft, means on one end of said shaft for connecting a fishing line thereto, a hook comprising a resilient shank paralleling the shaft in side-abutting engagement therewith throughout the length of said shank and having one end portion affixed thereto and its remaining portion free thereof, said shank being shorter than the shaft and having its ends spaced inwardly from the ends of said shaft, a foldable bill pivotally mounted on the free end portion of the shank, and a cam on the pivoted end of the bill adapted to ride on the shaft for tensioning the shank and frictionally securing the bill in folded position.

2. A fishing device comprising a shaft, means on one end of said shaft for connecting a fishing line thereto, a hook comprising a resilient shank paralleling the shaft in side-abutting engagement therewith throughout the length of said shank and having one end portion affixed thereto and its remaining portion free thereof, said shank being shorter than the shaft and having its ends spaced inwardly from the ends of said shaft, a foldable bill pivotally mounted on the free end portion of the shank, and a cam on the pivoted end of the bill adapted to ride on the shaft for tensioning the shank and frictionally securing the bill in folded position, said shaft having a longitudinal groove therein receiving said shank, said cam being operable in said groove.

3. A fishing device comprising a shaft having a plurality of longitudinal grooves in one end portion thereof, a plurality of hooks including resilient shanks paralleling said shaft in side-abutting engagement therewith and having one end portion affixed longitudinally to the other end portion of said shaft, the other end portions of said shanks being free of said shaft and engaged longitudinally in the grooves, foldable bills pivotally mounted on said free end portions of the shanks, and cams on the pivoted ends of said bills engaged with the shaft and operable in the grooves for tensioning the shanks when the bills are swung toward folded position for frictionally securing said bills in said folded position.

References Cited in the file of this patent

UNITED STATES PATENTS

| | | |
|---|---|---|
| 729,435 | Smith | May 26, 1903 |
| 827,246 | Livingston | July 31, 1906 |
| 2,496,822 | Stoddard | Feb. 7, 1950 |
| 2,506,349 | Day | May 2, 1950 |
| 2,534,469 | Moore | Dec. 19, 1950 |